United States Patent
Provitola

[11] Patent Number: 6,148,609
[45] Date of Patent: Nov. 21, 2000

[54] TURBO-ROCKET THRUSTER

[76] Inventor: Anthony Italo Provitola, P.O. Box 2855, DeLand, Fla. 32721-2855

[21] Appl. No.: 09/321,796

[22] Filed: May 27, 1999

[51] Int. Cl.[7] .................................................. F02K 5/00
[52] U.S. Cl. ........................................................ 60/246
[58] Field of Search ........................ 60/246, 39.465, 60/267, 260

[56] References Cited

U.S. PATENT DOCUMENTS

| | | | |
|---|---|---|---|
| 3,849,662 | 11/1974 | Blaskowski et al. | 290/2 |
| 4,212,160 | 7/1980 | Blaskowski | 60/39.12 |
| 4,224,790 | 9/1980 | Christensen | 60/224 |
| 5,012,640 | 5/1991 | Mirville . | |
| 5,014,507 | 5/1991 | Rice . | |
| 5,014,508 | 5/1991 | Lifka | 60/224 |
| 5,063,734 | 11/1991 | Morris . | |
| 5,101,622 | 4/1992 | Bond | 60/246 |
| 5,778,658 | 6/1998 | Lamando . | |

*Primary Examiner*—Timothy S. Thorpe
*Assistant Examiner*—William Rodriguez

[57] ABSTRACT

A turbo-rocket thruster is disclosed in which the turbine compressor is used to intake and compress a gaseous fuel for combustion with a stored oxidizer injected into the compressed gaseous fuel stream. The compressor stage is driven by the turbine stage, which is driven by burning gaseous fuel passing across the turbine blades. The burned gases are then expanded through an exhaust nozzle and thereby ejected to produce reaction thrust.

20 Claims, 1 Drawing Sheet

TURBO-ROCKET THRUSTER

CROSS-REFERENCE TO RELATED APPLICATIONS

U.S. patent application Ser. No. 09/301,139, Airship/Spacecraft.

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

The present invention is a turbo-rocket thruster which is a reaction thrusting power plant capable of accelerating a spacecraft to sub-orbital and orbital speeds and altitudes. The principal use of the present invention is on aircraft and spacecraft having a large reservoir of gaseous fuel, which may be combustible by oxidation or in some other exothermic reaction, particularly a combination airship and spacecraft.

The preferred gaseous fuel for the turbo-rocket thruster is a gaseous fuel that contains hydrogen gas. The reservoir containing such gaseous fuel may be the gas retaining structures of an airship, such as gas bags, wherein the gaseous fuel serves as the lifting gas.

The types of propulsion systems which create a propulsion force known as thrust to propel vehicles at high altitudes are the rocket motor and the jet engine. The propulsion force is the reaction force arising from increasing the backward momentum of a mass by the action of the propulsion system. In the case of the rocket motor, the rearward ejected mass comes from the propellant chemicals carried with the vehicle, and the backward momentum from the reaction between those propellant chemicals. In the case of the jet engine, addition of heat energy to a controlled flow of air passing through the jet engine increases the backward momentum of the airflow.

Some of the features of the present invention disclosed here as the "turbo-rocket thruster" relate to features of both jet engines and rocket motors. The use of the hyphenated description "turbo" in the present invention relates to the inclusion in the present invention of a turbine compressor driven by a gas turbine, as in a jet engine. The noun "rocket" relates to the fact that the present invention involves the rearward ejection of mass which may come from the chemical reaction of propellant chemicals which are carried with the vehicle, in this case a reservoir of fuel in a gaseous state and a reservoir of oxidizer. Unlike conventional jet engines which compress intaken air, the turbine compressor of the turbo-rocket thruster is used to compress intaken gaseous fuel, which may not otherwise have sufficient density for efficient combustion, to a state of greater density. Also, unlike conventional jet engines, the combustion of the gaseous fuel compressed by the turbine compressors takes place with a stored oxidizer which is injected into the compressed gaseous fuel stream.

The use of gaseous hydrogen as fuel for power plants which compress air with turbine compressors is known from U.S. Pat. No. 5,012,640, The Combined Air-Hydrogen Turbo-Rocket Power Plant. The power plant disclosed in that patent, however, uses evaporating liquid hydrogen to drive a turbine which powers a turbine compressor to compress air into which gaseous hydrogen is injected for combustion, and does not use the turbine compressor to compress the hydrogen. Also, that power plant does not use stored oxidizer to burn the hydrogen, but uses the air which has been compressed for such combustion.

The present invention has elements that are covered generally by class 60, power plants, particularly subclass 246.

BRIEF SUMMARY OF THE INVENTION

The present invention is a reaction thrusting power plant which uses a gaseous fuel and is capable of accelerating a spacecraft to sub-orbital and orbital speeds and altitudes. The turbo-rocket thruster may be used on aircraft and spacecraft having a large reservoir of gaseous fuel.

The turbo-rocket thruster is particularly suited to operate with a gaseous fuel such as hydrogen lifting gas which has been rarefied, by compressing the hydrogen lifting gas with its turbine compressor. Such operation of a turbo-rocket thruster is most likely where atmospheric oxidizer is unavailable, and therefore the turbo-rocket thruster must be equipped to use stored oxidizer.

The turbo-rocket thruster includes a duct casing which defines a gas duct, which in turn defines a gas intake, a combustion chamber, and an exhaust nozzle, and surrounds an axial compressor stage, combustion chamber stage, and an axial turbine stage. The axial compressor is driven by the axial turbine.

The operation of the turbo-rocket thruster involves the intaking of hydrogen lifting gas drawn from one or more reservoirs, or from the upper atmosphere, by the axial compressor. With compression by the axial compressor the hydrogen lifting gas is sent to a combustion chamber to be mixed with an injected oxidizer for ignition and burning. The energetic products of the combustion of the hydrogen lifting gas then flow through and power the axial turbine, which is connected by a shaft to and powers the axial compressor. The energetic exhaust gasses then exit from the exhaust nozzle to the space outside the gas duct to provide reaction thrust.

An oxidizer such as liquid oxygen may be first pumped to a heat exchanger in the one or more components of the exhaust nozzle so as to absorb the heat of the exhaust gases passing through the exhaust nozzle and cool the one or more components of the exhaust nozzle. Under certain operating conditions, or for certain oxidizers useable without vaporization, the heat exchanger may be bypassed.

DETAILED DESCRIPTION OF THE INVENTION

Figure 1:
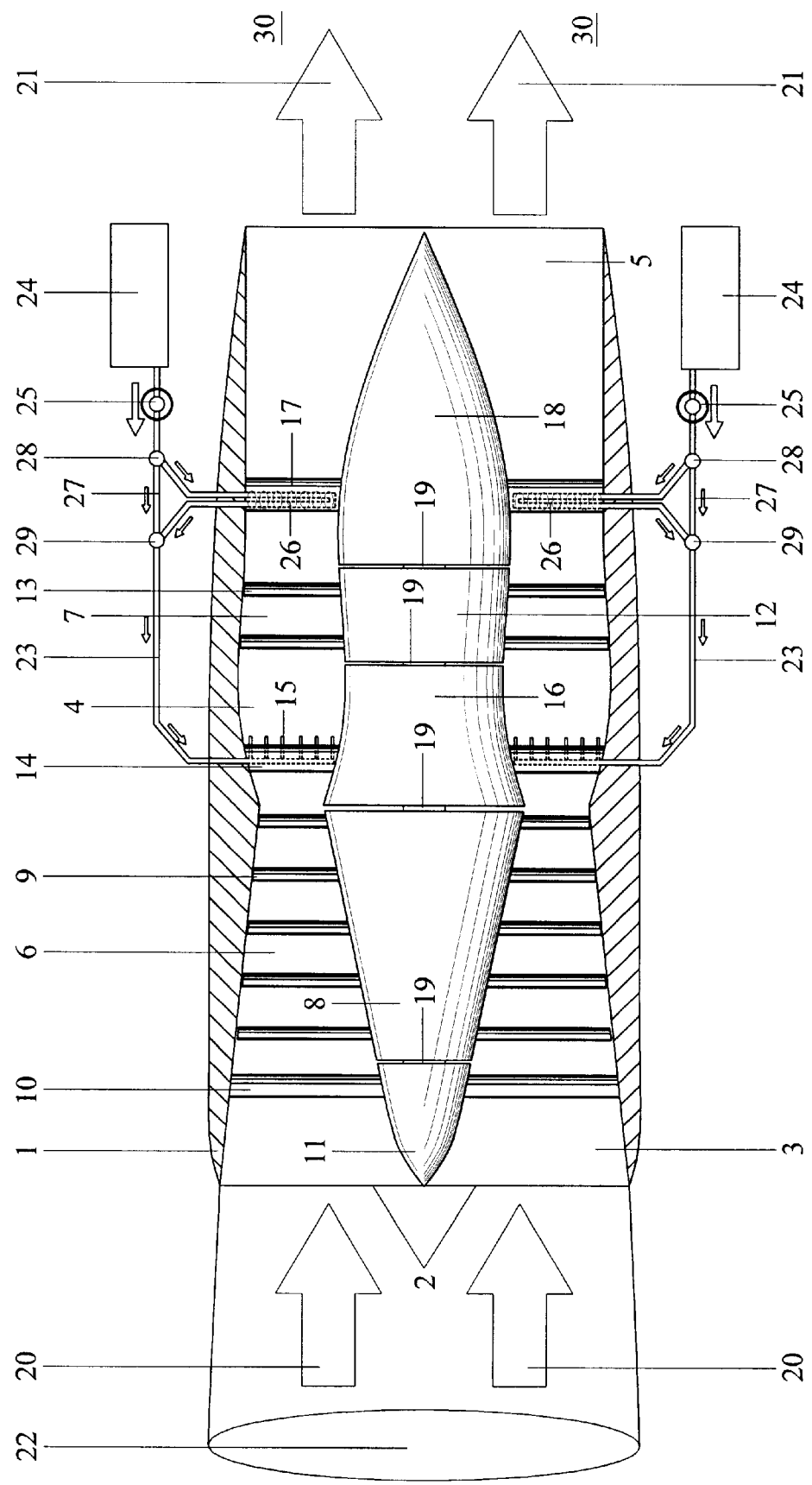
FIG. 1 is a longitudinal sectional view illustrating the power plant according to the invention.

The present invention is a reaction thrusting power plant which uses a gaseous fuel and is capable of accelerating a spacecraft to sub-orbital and orbital speeds and altitudes. The turbo-rocket thruster may be used on aircraft and spacecraft having a large reservoir of gaseous fuel combustible by oxidation, and in particular on a vehicle which is a combination airship and spacecraft. Such a vehicle is the subject of the U.S. patent application Ser. No. 09/301,139, Airship/Spacecraft, in which the present invention was partially disclosed in connection therewith. The turbo-rocket thruster can compress the gaseous fuel for efficient combustion with an injected oxidizer to produce reaction thrust. In the case of an airship which uses lifting gas that includes gaseous hydrogen, such a lifting gas may serve as the gaseous fuel for the turbo-rocket thruster. A lifting gas that contains hydrogen gas as a component may hereinafter be referred to as the hydrogen lifting gas. The turbo-rocket thruster is particularly suited to operate with hydrogen lifting gas, which may have been rarefied by an increase in volume of the structure in which hydrogen lifting gas is contained, by compressing the hydrogen lifting gas with a turbine compressor.

Although the turbo-rocket thruster has been disclosed as operating by oxidizing a gaseous fuel, the present invention may operate with other combinations of propellant chemicals which react exothermally or are otherwise productive in the release of energy in some form. Reference herein to a propellant chemical also means a compatible mixture of propellant chemicals. In the latter case of operation of the turbo-thruster, a first propellant chemical is gaseous and intaken for compression as such, and the second propellant chemical is either liquid or gaseous and injected into the compressed first propellant chemical.

The embodiment of the turbo-rocket thruster illustrated in FIG. 1 includes a duct casing 1 which defines a gas duct 2, which in turn defines a gas intake 3, a combustion chamber 4, and an exhaust nozzle 5, and surrounds an axial compressor stage 6, a combustion chamber stage, and an axial turbine stage 7. The axial compressor stage 6 has at least one compressor rotor 9 having a plurality of compressor blades 9 extending radially therefrom. The compressor rotor 8 of the axial compressor to 9 and 9 is located downstream of first stator guide vane 10 which supports a first hub 11 coaxially with the longitudinal axis of the gas duct 2 to rotatably support the compressor rotor 8. The axial compressor 8 and 9 is driven via a shaft 19 by the axial turbine stage 7, which includes at least one turbine rotor 12 with a plurality of turbine blades 13 extending radially therefrom. The axial turbine 12 and 13 is driven by the burning gaseous fuel passing across the turbine blades 13. The turbine rotor 12 of the axial turbine 12 and 13 is located downstream of a second stator guide vane 14, which supports the oxidizer injectors 15 and in which the oxidizer injectors 15 are located. The second stator guide vane 14 supports a second hub 16 coaxially with the longitudinal axis of the gas duct 2 to also rotatably support the compressor rotor 8 with the first hub 11. The turbine rotor 12 of the axial turbine 12 and 13 is located upstream of a third stator guide vane 17, which supports a third hub 18 coaxially with the longitudinal axis of the gas duct 2 to also rotatably support, together with the second hub 16, the turbine rotor 12.

The operation of the turbo-rocket thruster commences with the intaking 2 of gaseous fuel 20 drawn from one or more reservoirs, or from the upper atmosphere, by the axial compressor 8 and 9. With compression by the axial compressor 8 and 9 the gaseous fuel is sent to a combustion chamber 4 to be mixed with an injected 15 oxidizer for ignition and burning. The energetic products of the combustion of the gaseous fuel then flow through and power the axial turbine 12 and 13, which is connected to and powers the axial compressor 8 and 9 via a shaft 19 and/or transmission.

Gaseous fuel is supplied to the turbine compressor 8 and 9 from a gas reservoir by at least one gaseous fuel pipe 22. The process of supplying gaseous fuel to the turbo-rocket thruster may be assisted by electromagnetically accelerating the gaseous fuel to the intake, pumping, including ultrasonic pumping, pre-compression, and contraction of the gaseous fuel reservoir.

The circuit for supplying oxidizer to the supply tube 23 starts at an oxidizer reservoir 24 storing oxidizer having an outlet connected to pump 25 which may pump the oxidizer from the reservoir 24 into supply tube 23. An oxidizer such as liquid oxygen may be first pumped 25 through a heat exchanger 26 included in the third stator guide vane 17 in the exhaust nozzle 5 so as to absorb the heat of the exhaust gases passing through the exhaust nozzle 5 and cool the third stator guide vane 17. The temperature of the liquid oxygen passing through the heat exchanger 26 is raised and the liquid oxygen vaporized so that gaseous oxygen passes through a supply tube 23 connected to the outlet of the heat exchanger 26. Liquid oxygen may also be made to pass through another heat exchanger consisting of tubes around and through the casing 1 of the exhaust nozzle 5 and the third hub 18 so as to absorb heat from the exhaust gases 21 and thereby initially raise its temperature and cool the exhaust nozzle 5 and the third hub 18.

Under certain operating conditions, or for certain oxidizers useable without vaporization prior to injection into the combustion chamber, the heat exchanger 26 may be bypassed by allowing the oxidizer to flow through bypass tube 27 and subsequently into supply tube 23 by the use of the three-way, three-port valves 28 and 29.

While the invention has been disclosed in a particular embodiment, it will be understood that there is no intention to limit the invention to the particular embodiment shown, but it is intended to cover the various alternative and equivalent constructions included within the spirit and scope of the appended claims.

What is claimed is:

1. A gaseous-fuel breathing, stored-oxidizer turbo-rocket thruster comprising:
    (a) a gas duct defining a gaseous-fuel intake;
    (b) a source of gaseous fuel;
    (c) a source of stored oxidizer;
    (d) a compressor means for compressing gaseous fuel, the compressor means being disposed axially within the gas duct;
    (e) injector means to inject oxidizer into the compressed gaseous fuel so that the oxidizer mixes with the compressed gaseous fuel;
    (f) a turbine means operatively associated with the compressor means to drive the compressor means, the turbine means being disposed axially within the gas duct, wherein the turbine means is driven by the gaseous fuel burning with the oxidizer; and
    (g) a nozzle means operatively associated with the gas duct to exhaust gasses from the gas duct.

2. The turbo-rocket thruster of claim 1, further comprising a heat exchange means interposed between the stored oxidizer source and the oxidizer injectors to raise the temperature of the oxidizer before entering the combustion chamber and to cool at least one component of the nozzle means.

3. The turbo-rocket thruster of claim 1, wherein the source of gaseous fuel is a reservoir of such gaseous fuel.

4. The turbo-rocket thruster of claim 1, wherein the gaseous fuel is hydrogen.

5. The turbo-rocket thruster of claim 1, wherein the compressor means comprises an axial compressor for compressing gaseous fuel, the axial compressor comprising at least one compressor rotor, each compressor rotor having a plurality of compressor blades extending radially therefrom and disposed within the gas duct.

6. The turbo-rocket thruster of claim 1, wherein the the turbine means comprises an axial turbine for driving the compressor means, the axial turbine comprising at least one turbine rotor, each turbine rotor having a plurality of turbine blades extending radially therefrom and disposed within the gas duct.

7. The turbo-rocket thruster of claim 1, further comprising a pump means to pump the oxidizer from the source of stored oxidizer through the oxidizer circuit to the injector means.

8. A turbo-rocket thruster comprising:

(a) a gas duct defining a gaseous-fuel intake;

(b) a source of gaseous fuel;

(c) a source of stored oxidizer;

(d) a turbine compressor for compressing gaseous fuel, the turbine compressor being disposed axially within the gas duct;

(e) one or more injectors to inject oxidizer into the compressed gaseous fuel so that the oxidizer mixes with the compressed gaseous fuel;

(f) a gas turbine operatively associated with the turbine compressor to drive the turbine compressor, the gas turbine being disposed axially within the gas duct, wherein the gas turbine is driven by the gaseous fuel burning with the oxidizer; and (g) a nozzle operatively associated with the gas duct to exhaust gasses from the gas duct.

9. The turbo-rocket thruster of claim 8, further comprising a heat exchanger interposed between the stored oxidizer source and the oxidizer injectors to raise the temperature of the oxidizer before entering the combustion chamber and to cool at least one component of the nozzle.

10. The turbo-rocket thruster of claim 8, wherein the source of gaseous fuel.

11. The turbo-rocket thruster of claim 8 wherein the gaseous fuel is hydrogen.

12. The turbo-rocket thruster of claim 8, wherein the turbine compressor comprises an axial compressor for compressing gaseous fuel the axial compressor comprising at least one compressor rotor each compressor rotor having a plurality of compressor blades extending radially therefrom and disposed within the gas duct.

13. The turbo-rocket thruster of claim 8, wherein the gas turbine comprises an axial turbine for driving the turbine compressor, the axial turbine comprising at least one turbine rotor, each turbine rotor having a plurality of turbine blades extending radially therefrom and disposed within the gas duct.

14. The turbo-rocket thruster of claim 8, further comprising a pump to pump the oxidizer from the source of stored oxidizer through the oxidizer circuit to the injectors.

15. A turbo-rocket thruster comprising:

(a) a gas duct defining a gaseous-fuel intake;

(b) a source of gaseous first propellant chemical;

(c) a source of second propellant chemical;

(d) a turbine compressor for compressing the gaseous first propellant chemical, the turbine compressor being disposed axially within the gas duct;

(e) one or more injectors to inject the second propellant chemical into the compressed gaseous first propellant chemical so that the second propellant chemical mixes with the compressed gaseous first propellant chemical;

(f) a gas turbine operatively associated with the turbine compressor to drive the turbine compressor, the gas turbine being disposed axially within the gas duct, wherein the gas turbine is driven by the gaseous first propellant chemical reacting exothermically with the second propellant chemical; and (g) a nozzle operatively associated with the gas duct to exhaust gasses from the gas duct.

16. The turbo-rocket thruster of claim 15, wherein the source of gaseous first propellant chemical is a reservoir of such gaseous first propellant chemical.

17. The turbo-rocket thruster of claim 15, further comprising a heat exchanger interposed between the second propellant chemical source and the second propellant chemical injectors to raise the temperature of the second propellant chemical before entering the combustion chamber and to cool at least one component of the nozzle.

18. The turbo-rocket thruster of claim 15, wherein the turbine compressor comprises an axial compressor for compressing the gaseous first propellant chemical, the axial compressor comprising at least one compressor rotor, each compressor rotor having a plurality of compressor blades extending radially therefrom and disposed within the gas duct.

19. The turbo-rocket thruster of claim 15, wherein the gas turbine comprises an axial turbine for driving the turbine compressor, the axial turbine comprising at least one turbine rotor, each turbine rotor having a plurality of turbine blades extending radially therefrom and disposed within the gas duct.

20. The turbo-rocket thruster of claim 15, further comprising a pump to pump the second propellant chemical from the source of stored second propellant chemical through the second propellant chemical circuit to the injectors.

* * * * *